(12) United States Patent
Janssen et al.

(10) Patent No.: US 7,787,266 B2
(45) Date of Patent: Aug. 31, 2010

(54) METHOD FOR OPERATING A FREQUENCY CONVERTER OF A GENERATOR

(75) Inventors: Wilhelm Janssen, Am Schwalbenberg (DE); Detlef Menke, Lotte (DE)

(73) Assignee: General Electric Company, Schenectady, NY (US)

( * ) Notice: Subject to any disclaimer, the term of this patent is extended or adjusted under 35 U.S.C. 154(b) by 743 days.

(21) Appl. No.: 10/571,735

(22) PCT Filed: Sep. 16, 2003

(86) PCT No.: PCT/EP03/10269
§ 371 (c)(1),
(2), (4) Date: Dec. 7, 2006

(87) PCT Pub. No.: WO2005/027301
PCT Pub. Date: Mar. 24, 2005

(65) Prior Publication Data
US 2007/0085344 A1    Apr. 19, 2007

(51) Int. Cl.
H02M 5/458    (2006.01)
H02M 5/45    (2006.01)
(52) U.S. Cl. .......................................... 363/37; 363/97
(58) Field of Classification Search ............. 363/34–37, 363/97, 131
See application file for complete search history.

(56) References Cited
U.S. PATENT DOCUMENTS

| | | | | |
|---|---|---|---|---|
| 4,876,637 A | * | 10/1989 | Mose et al. | 363/37 |
| 5,483,127 A | * | 1/1996 | Widmayer et al. | 315/307 |
| 5,798,631 A | | 8/1998 | Spee et al. | |
| 6,144,190 A | * | 11/2000 | Scott et al. | 322/25 |
| 6,577,108 B2 | * | 6/2003 | Hubert et al. | 323/207 |
| 6,671,585 B2 | * | 12/2003 | Lof et al. | 705/36 R |
| 6,850,424 B2 | * | 2/2005 | Baudelot et al. | 363/37 |

FOREIGN PATENT DOCUMENTS

DE    10010350 A    9/2001

OTHER PUBLICATIONS

PCT International Search Report issued on Jul. 5, 2004 in connection with PCT Application No. PCT/EP2003/10269 by the European Patent Office.

(Continued)

*Primary Examiner*—Gary L Laxton
*Assistant Examiner*—Fred E Finch, III
(74) *Attorney, Agent, or Firm*—Global Patent Operation; Douglas D. Zhang

(57) ABSTRACT

The method relates to the operation of a frequency converter of a generator in particular of a wind energy turbine, in the event of a substantial grid voltage drop, wherein the frequency converter (10) comprises an AC/DC converter (20), to be connected to the generator (14), a DC/AC converter (22) to be connected to the voltage grid (18), and a DC link circuit (24) for connecting the AC/DC converter (20) to the DC/AC converter (22). The method comprises the step of reducing an output voltage of the DC link circuit (24) for increasing an output current of the DC/AC converter (22) and/or reducing the operation frequency of electronic switches (28) of the DC/AC converter (22) for increasing the output current of the DC/AC converter (22).

11 Claims, 1 Drawing Sheet

OTHER PUBLICATIONS

"Power losses in PWM-VSI inverter using NPT or PT IGBT devises", Blaabjerg F. et al., Power Electronics Specialists Conference, PESC 1994 Record., 25th Annual IEEE Taipei, Taiwan, NY, NY, USA, IEEE, Jun. 20, 1994, pp. 434-441, XP010549405.

"An Introduction to Power Electronics", Bird/King/Pedder, 1993, John Wiley & Sons, XP002284830 2, p. 85-86.

"Semiconductor Power Losses in AC inverters", Berringer, K. et al., Oct. 8, 1995, Industry Applications Conference, pp. 882-888, XP010193037.

PCT International Written Opinion from PCT Application No. PCT/EP2003/10269, Jul. 5, 2005.

Section of "Verlustleistung von Frequenzumrichter" of "Energiesparent mit Frequenzumrichter", Benno Jackli, Internet Article, Dec. 2, 1996, XP002284829, <URL:http://www.energie.ch/themen/industrie/fr/>.

* cited by examiner

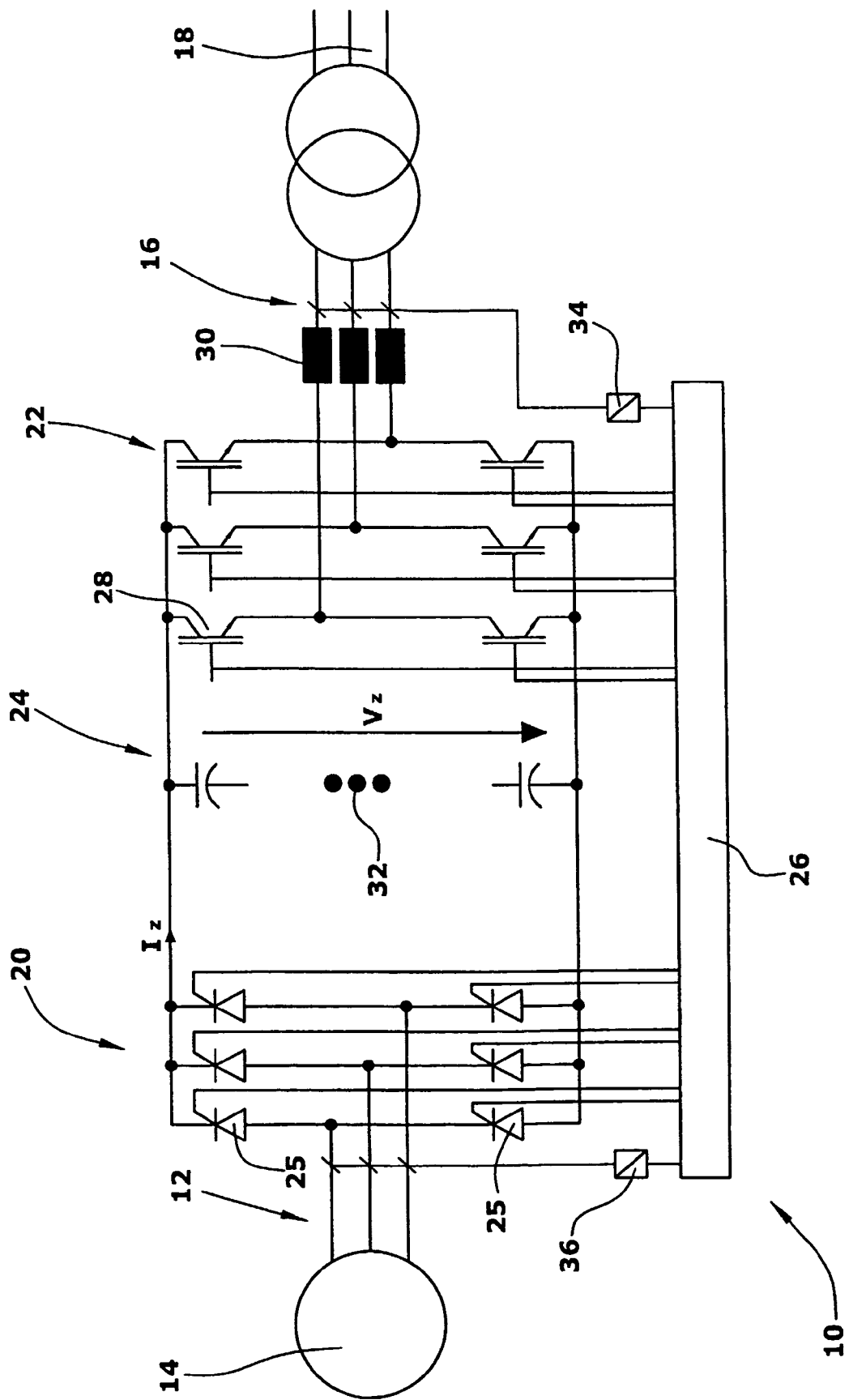

METHOD FOR OPERATING A FREQUENCY CONVERTER OF A GENERATOR

BACKGROUND OF THE INVENTION

1. Field of the Invention

The present invention relates to the operation of power converters for supplying electrical power to a grid and, in particular, to a frequency converter of a generator of a wind energy turbine.

2. Related Prior Art

Electrical power in public power grids is supplied by diverse energy sources converting mechanical energy into electrical energy. The main energy sources supporting public power grids are coal power plants and nuclear power plants. Several other types of energy sources, in particular power plants of regenerative energy like solar power plants, water power plants or wind energy turbines, also contribute to support the public power grid.

In the past, in the event of a significant grid voltage drop in a public power grid, it was required that in such an event wind energy turbines are shut down automatically. However, due to the increased number of wind energy turbines it becomes more and more important that these turbines support the public power grid in the event of a substantial grid voltage drop. However, due to thermal stresses applied to the electronic components of the frequency converter of a generator converting mechanical energy into electrical energy, increasing the output current of the converter in the event of a grid voltage drop is critical and limited.

Accordingly, it is an object of the present invention to increase the output current of a generator in particular of a wind energy turbine in the event of a substantial grid voltage drop.

SUMMARY OF THE INVENTION

According to the invention there is provided a method for operating a frequency converter of a generator in particular of a wind energy turbine, in the event of a substantial grid voltage drop, wherein the frequency converter includes an AC/DC converter, to be connected to the generator, a DC/AC converter to be connected to the voltage grid, and a DC link circuit for connecting the AC/DC converter to the DC/AC converter, the method including the step of reducing an output voltage of the DC link circuit for increasing an output current of the DC/AC converter and/or reducing the operation frequency of electronic switches of the DC/AC converter for increasing the output current of the DC/AC converter.

The solution proposed by the present invention for solving the above-mentioned object relates to an increase of the current to be supplied into the public power grid in the event of a substantial grid voltage drop. According to a first aspect of the invention, the increase of the output current of the DC/AC converter, i.e. of the frequency converter, is performed by reducing the output voltage of the DC link circuit of the frequency converter, the output voltage being the operating voltage for the DC/AC converter of the frequency converter. By means of reducing the output voltage of the DC link circuit it is possible to increase the current flowing through the electronic switches (typically transistors) of the DC/AC converter without increasing the energy losses of the electronic switches which occur under normal operation conditions of the frequency converter. In particular, the electronic switches includes transistors, (e.g., IGBT modules) as is generally known by those of ordinary skill in the art.

According to a second aspect of the present invention, the switching frequency of the electronic switches of the DC/AC converter is reduced resulting in an increase of the output current of the DC/AC converter supplied to the power grid. Also, according to this aspect of the invention, when a substantial grid voltage drop occurs, there are substantially no changes of the energy losses in the electronic switches which are given under normal operation conditions of the frequency converter.

According to a further aspect of the present invention, the steps described above whereby the output voltage and operating frequency are reduced, can occur simultaneously.

In another embodiment, the output voltage of the DC link circuit can be reduced by reducing the output voltage of the DC link circuit within the DC link circuit itself, i.e. by activating voltage dividers or the like. Yet another advantageous approach relates to controlling the time interval for which electronic switches of the AC/DC converter are in their on-state. Namely, depending on the operating state (on or off) of the electronic switches, (typically thyristors), the output voltage of the AC/DC converter can be controlled. The shorter the time interval for the on-state of the electronic switches of the AC/DC converter is, the lower the output voltage of the AC/DC converter is.

According to another aspect of the present invention, the reducing step described above or at least one of the reducing steps is performed when, for a short time (msec up to sec), the grid voltage is decreased. The level of voltage decrease for initiating at least one of the reducing steps depends on the design of components. The reducing step or at least one of the reducing steps is terminated when, for a short time (msec up to sec), the normal grid voltage is increased again up a certain level (near nominal value).

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawing schematically showing the circuitry of the frequency converter arranged between a generator and a power grid.

DESCRIPTION OF A REFERRED EMBODIMENT

Reference will now be made in detail to the various embodiments of the invention, one or more examples of which are illustrated in the drawings. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

In the drawing, the circuitry of a frequency converter 10 as used for providing electrical power to a power grid is shown. The frequency converter is arranged between the output 12 of a generator 14 of a wind energy turbine (not shown) and the input 16 of a power grid 18.

The frequency converter 10 includes three major stages, namely an input stage, an intermediate stage, and an output stage. The input stage is configured as an AC/DC converter 20, while the output stage includes a DC/AC converter 22. These two converters 20,22 are connected by the intermediate stage which is configured as a DC link circuit 24.

In this embodiment, the AC/DC converter 20 and the DC/AC converter 22 both typically includes electronic semiconductor power elements. However, other electronic or electrical elements are also possible to be used. In particular, in this embodiment, the AC/DC converter 20 includes six thyristors 25 controlled by a control unit 26, which in turn is controlled by depending on the current operation parameters of the wind energy turbine and environmental conditions. As an alternative, diodes can be used in place of the thyristors 25. As shown herein, the DC/AC converter 22 includes six transistors 28, which are also controlled by the control unit 26. Various types of transistors can be used according to the present invention for electrical power converters, such as IGBT modules. As also known by those of ordinary skill in the art, the DC/AC converter 22 includes a filtering device at its output end, which in this embodiment includes three inductors 30.

The DC link circuit 24 normally includes at least one filter for the DC link current which can configured as DC link chokes (not shown). Moreover, the DC link circuit includes an electrical energy storage device 32, which can be for example a capacitor bank, a battery, a super-capacitor or the like.

Grid voltage drops can be sensed by means of a grid voltage sensor 34 connected to the control unit 26. In a similar manner, the output voltage of the generator 14 can be sensed by a stator voltage sensor 36 also connected to the control unit 26.

In the event of a grid voltage drop, it is necessary that the generator 14 of a wind energy turbine is capable of supporting the grid so that the required electrical power is generated and supplied to the grid 18. There are two approaches according to the invention which can be used for increasing the electrical power supplied to the grid in the event of a grid voltage drop. The first approach according to the present invention relates to the reduction of the output voltage $V_z$ of the DC link circuit 24, which can be achieved for example by controlling the AC/DC converter 20 accordingly. For doing so, the thyristors 25 of the AC/DC converter 20 needs to be controlled according to the phase shifts of the stator of the generator 14. Also the frequency of the stator has to be detected or determined. In accordance with these parameters, the control of the thyristors 25 is amended so as to reduce the output voltage $V_z$ of the DC link circuit 24.

The output voltage of the DC link circuit 24 can be reduced by controlling the time interval between the crossover or zero-crossing of the output voltage of a phase of the generator 14 and the operation of the electronic switch 25 of the AC/DC converter 20.

Due to the reduction of the output voltage $V_z$ of the DC link circuit 24, in the event of a grid voltage drop the output current $I_C$ of the DC/AC converter 22 can be increased without changing the power losses in the transistors 28 so that these power losses are substantially left unchanged when compared with the conditions under normal operation.

In the following, an example is given showing an increase of the current in the event of a grid voltage drop.

Assuming that under normal conditions, for the frequency converter 10 the following parameters are given. The output voltage $V_z$ of the DC link circuit 24 is 600 V and the output current $I_C$ is 1600 A. The allowable temperature of a transistor 28 is 125° C. and the duty cycle of the transistors 28 is 1. The energy losses $E_{on}$ when switching on a transistor 28 is 210 mWs, the energy losses $E_{off}$ when switching off a transistor 28 is 260 mWs, and the energy losses $E_{rec}$ during the interval in which a transistor 28 is switched off is 115 mWs. It is to be noted that these parameters are merely examples and that variations are possible accordingly.

Assuming further that the switching frequency f is 2500 1/s, the power losses based on $E_{on}$, $E_{off}$, and $E_{rec}$ as well as the power loss $P_{sw}$ during the on-state of a transistor 28 are as follows:

$$P_{on} + P_{off} + P_{rec} = (E_{on} + E_{off} + E_{rec}) * f$$
$$= (0.210\ Ws + 0.260\ Ws + 0.115\ Ws) * 2500\ 1/s$$
$$= 0.585\ Ws * 2500\ 1/s$$
$$= \underline{1462.5\ W}$$

$$P_{sw} = V_{ce} * I_c * \frac{\text{(on-state interval)}}{\text{(on + off state interval)}}$$
$$= 2.4\ V * 1600\ A * 1/2$$
$$= \underline{1920\ W}$$

$$P = P_{on} + P_{off} + P_{rec} + P_{sw}$$
$$= \underline{3382.5\ W}$$

Assuming further that the output voltage $V_z$ of the DC link circuit 24 is reduced to 30% and further assuming that $P_{on}$, $P_{off}$, and $P_{rec}$ are substantially reduced by the same percentage, the overall sum of these power losses is as follows:

$$P_{on} + P_{off} + P_{rec} = 1/3 * 1462.5\ W$$
$$= 487.5\ W$$

$$P = 1920\ W + 487.5\ W$$
$$= 2407.5\ W$$

In order to not exceed the power losses as under normal operational condition, the output current $I_c$ can be increased by approximately about 30% up to $I_c$=2100 A (for 2407.5 W).

It is to be noted that the percentage of the increase of the maximum output current $I_c$ is independent from type of transistor 28 used.

Another measure for increasing the output current $I_c$ in the event of a grid voltage drop is to reduce the switching frequency f for the transistors 28. Namely, when the transistors 28 are switched on for a shorter period of time, when maintaining the current unchanged, the energy losses are reduced. Accordingly, if the energy losses can be left unchanged, the current can be increased.

In the following an example based on the above-mentioned parameters will be given for this scenario.

Assuming that the switching frequency f is reduced from 2500 1/s to 500 1/s, the following equations can be obtained:

$$P_{on} + P_{off} + P_{rec} = (E_{on} + E_{off} + E_{rec}) * f$$
$$= (0.210\ Ws + 0.260\ Ws + 0.115\ Ws) * 500\ 1/s$$
$$= 0.585\ Ws * 500\ 1/s$$
$$= \underline{292.5\ W}$$

$$P_{sw} = V_{ce} * I_c * \frac{\text{(on-state interval)}}{\text{(on + off state interval)}}$$
$$= 2.4\ V * 1600\ A * 1/2$$
$$= \underline{1920\ W}$$

-continued $$P = 1920\,W + 292.5\,W$$
$$= 2212.5\,W$$

Therefore, for obtaining the same overall power losses as in the event of normal operation, the output current $I_c$ can be increased up to $I_c$=2200 A (for 2212.5 W).

Although the invention has been described and illustrated with reference to specific illustrative embodiments thereof, it is not intended that the invention be limited to those illustrative embodiments. Those skilled in the art will recognise that variations and modifications can be made without departing from the true scope of the invention as defined by the claims that follow. It is therefore intended to include within the invention all such variations and modifications as fall within the scope of the appended claims and equivalents thereof.

The invention claimed is:

1. A method for operating a frequency converter for a generator of a wind turbine supplying electrical power to a public power grid, wherein the frequency converter comprises an AC/DC converter connected to the generator, a DC/AC converter connected to the grid, and a DC link circuit for connecting the AC/DC converter to the DC/AC converter, the method comprising the steps of:
   sensing a grid voltage of the grid to detect a grid condition wherein the grid voltage decreases by at least a predetermined threshold and remains below the predetermined threshold for at least a predetermined time; and
   reducing, upon detection of the grid condition, at least one of:
      an output voltage of the DC link circuit for increasing an output current of the DC/AC converter, and
      an operation frequency of electronic switches of the DC/AC converter for increasing the output current of the DC/AC converter.

2. The method of claim 1, wherein the predetermined threshold is about 10% of a nominal voltage of the grid, and wherein the reducing step is terminated when, for a few seconds, the grid voltage is increased to at least about 80% of the nominal voltage.

3. The method of claim 1, wherein the predetermined threshold is about 20% of a nominal voltage of the public power grid, and wherein the reducing step is terminated when, for a few seconds, the grid voltage is increased to at least about 90% of the nominal voltage.

4. The method of claim 1, wherein the reducing step comprises reducing the output voltage of the DC link circuit by controlling a time interval between a zero-crossing of the output voltage of a phase of the generator and an operation of an electronic switch of the AC/DC converter.

5. The method of claim 1, wherein the reducing step comprises reducing the output voltage of the DC link circuit by reducing a pulse width interval of an electronic switch of the AC/DC converter.

6. The method of claim 1, wherein the reducing step is performed such that the output current of the DC/AC converter is increased without a substantial change of energy losses in the electronic switches of the DC/AC converter.

7. The method of claim 1, further in the reducing step, reducing simultaneously both the output voltage of the DC link circuit and the operation frequency of electronic switches of the DC/AC converter for increasing the output current of the DC/AC converter.

8. A method for operating a frequency converter for a generator of a wind turbine supplying electrical power to a public power grid, in the event of a substantial grid voltage drop in the grid, wherein the frequency converter comprises an AC/DC converter connected to the generator, a DC/AC converter connected to the grid, and a DC link circuit for connecting the AC/DC converter to the DC/AC converter, the method comprising the step of:
   reducing an operation frequency of electronic switches of the DC/AC converter for increasing the output current of the DC/AC converter.

9. The method of claim 8, wherein the reducing step is performed when, for a few seconds, the grid voltage is decreased by at least about 10% of a nominal voltage of the grid, and wherein the reducing step is terminated when, for a few seconds, the grid voltage is increased to at least about 80% of the nominal voltage.

10. The method of claim 8, wherein the reducing step is performed when, for a few seconds, the grid voltage is decreased by at least about 20% of a nominal voltage of the grid, and wherein the reducing step is terminated when, for a few seconds, the grid voltage is increased to at least about 90% of the nominal voltage.

11. The method of claim 8, wherein the reducing step is performed such that the output current of the DC/AC converter is increased without a substantial change of energy losses in the electronic switches of the DC/AC converter.

* * * * *